United States Patent [19]

Shellhause

[11] 4,328,883
[45] May 11, 1982

[54] HYDRAULIC ACTUATOR MECHANISM FOR A FRICTION CLUTCH

[75] Inventor: Ronald L. Shellhause, Vandalia, Ohio

[73] Assignee: General Motors Corporation, Detroit, Mich.

[21] Appl. No.: 187,813

[22] Filed: Sep. 16, 1980

[51] Int. Cl.³ .............................................. F16D 25/08
[52] U.S. Cl. ............................ 192/85 CA; 192/91 A; 192/110 R; 92/165 PR
[58] Field of Search ................... 192/98, 99 A, 110 R, 192/110 B, 89 B, 85 C, 85 CA, 99 S, 91 A; 92/165 PR, 165 R, 146

[56] References Cited

U.S. PATENT DOCUMENTS

| | | | |
|---|---|---|---|
| 2,969,052 | 1/1961 | Randol | 192/91 A |
| 3,548,989 | 12/1970 | Root | 192/111 |
| 3,907,085 | 9/1975 | Rist | 192/85 CA |
| 3,974,901 | 8/1976 | Cervinka et al. | 192/83 |

FOREIGN PATENT DOCUMENTS

| | | | |
|---|---|---|---|
| 1231290 | 5/1971 | United Kingdom | 192/91 A |
| 1234402 | 6/1971 | United Kingdom | 192/91 A |
| 1255002 | 11/1971 | United Kingdom | 192/91 A |

*Primary Examiner*—George H. Krizmanich
*Attorney, Agent, or Firm*—Donald F. Scherer

[57] ABSTRACT

A hydraulic clutch actuator has two pistons operatively connected to a force transmitting member which abuts the clutch throw out bearing. The pistons are slidably disposed in respective cylinders which are formed in a housing and interconnected by passages also formed in the housing, whereby pressurized fluid can be delivered to the cylinders. The pistons, when pressurized, slide along their respective longitudinal axes which are parallel to each other and also parallel to and radially displaced from the axis of the clutch output shaft. Each piston has a hook portion on the end thereof, which engages the force transmission member and a flat surface formed parallel to the longitudinal axis for a portion of the piston length. The flat surface cooperates with a pin secured in the wall of the cylinder so that rotation of the piston in the cylinder is prevented.

3 Claims, 4 Drawing Figures

HYDRAULIC ACTUATOR MECHANISM FOR A FRICTION CLUTCH

This invention relates to manual clutch actuators and more particularly to manual clutch actuators wherein a hydraulic mechanism is disposed between the manual operator in the clutch actuator.

It is an object of this invention to provide an improved clutch actuator wherein the clutch throw out bearing concentric with the clutch shaft is moved during clutch disengagement by a pair of hydraulically actuated pistons slidably disposed in respective cylinders displaced equidistant from the axis of the shaft.

It is another object of this invention to provide an improved clutch actuator wherein the actuator includes a housing having a pair of cylinders connected by internal fluid passages in the housing and which actuator has a pair of fluid operated pistons slidably disposed in respective cylinders on the longitudinal axis thereof which are parallel to the axes of the clutch shaft and wherein the three axes are coplanar.

It is yet another object of this invention to provide an improved clutch actuator wherein a compact actuator assembly includes a housing having a pair of cylinders interconnected by internal passages in the housing with a piston slidably disposed and restrained from rotation in each cylinder and which housing can be installed in a transmission bell housing to replace a conventional mechanical linkage clutch actuator mechanism with a hydraulic actuator mechanism.

These and other objects and advantages of the present invention will be more apparent from the following description and drawings in which.

Figure 1:
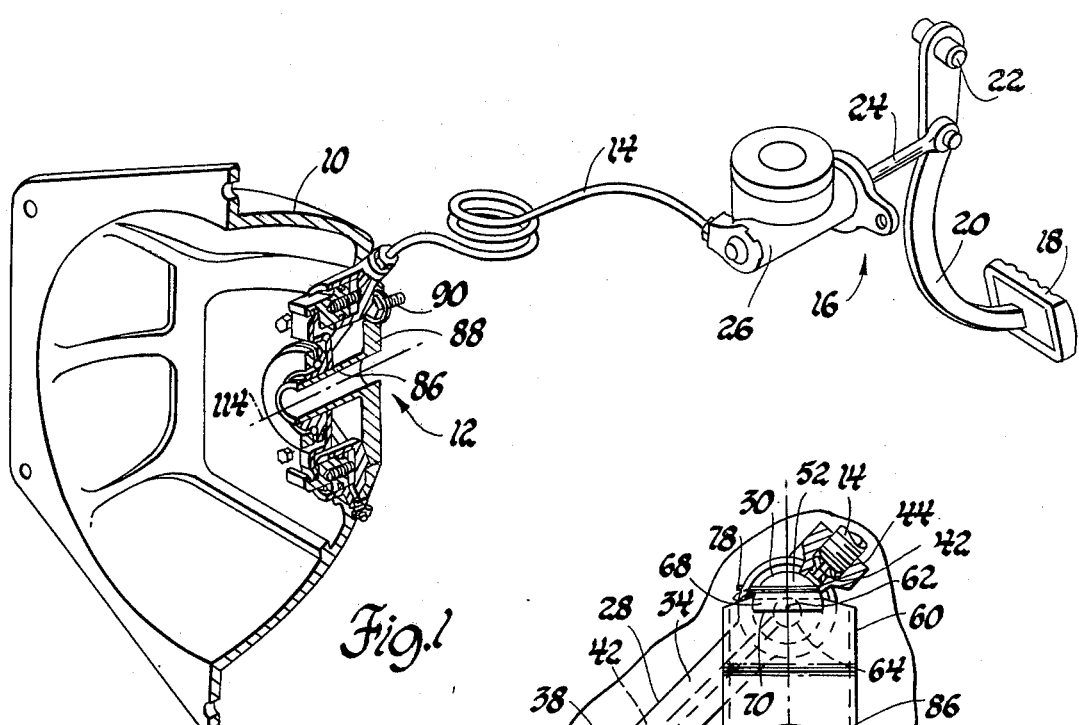
FIG. 1 is a perspective view, partly in section, showing a hydraulic actuator mechanism.

Referring to the drawings, there is seen a transmission bell housing 10 in which is disposed a hydraulic actuator mechanism 12 which is connected through a hydraulic passage 14 with a manual pedal mechanism 16. The pedal mechanism 16 includes a foot pad 18 connected to a pedal lever 20 which is pivoted on pin 22 and drivingly connected to a push rod 24. The push rod 24 is operatively connected with a conventional master cylinder 26 which may be constructed in accordance with the master cylinder structures generally used for vehicle brake mechanisms.

Figure 3:
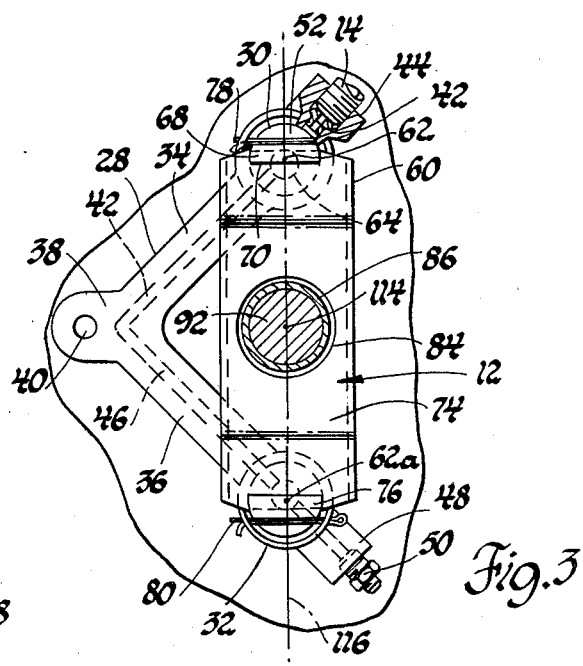
FIG. 3 is a view taken along line 3—3 of FIG. 2.
Figure 2:
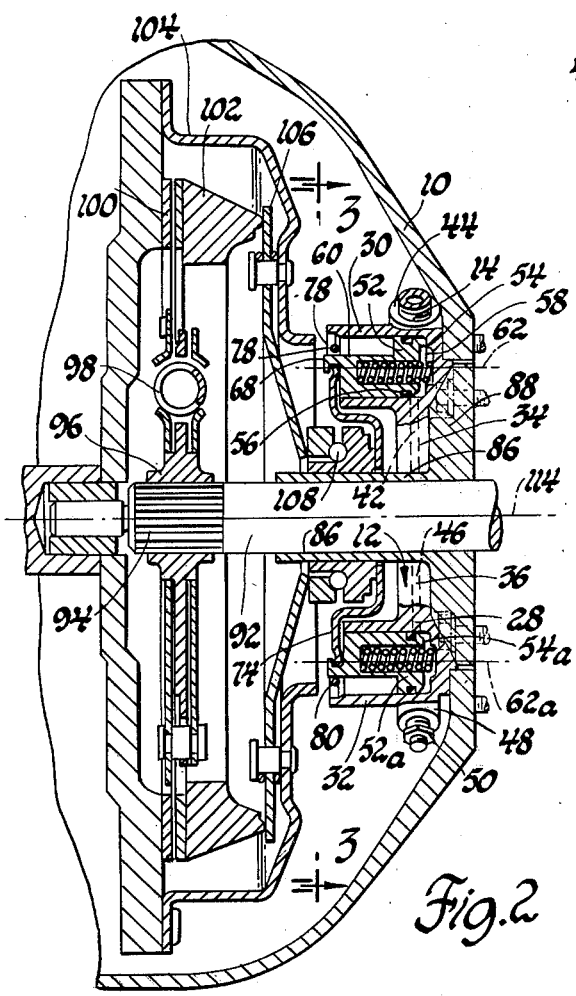
FIG. 2 is a cross-sectional elevational view of a clutch actuator mechanism and friction clutch.
Figure 4:
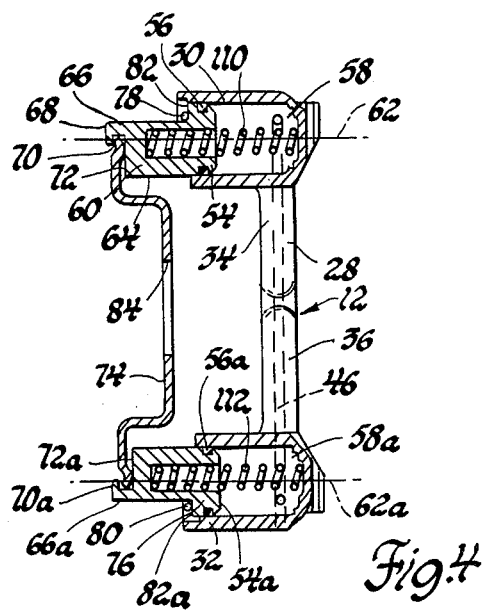
FIG. 4 is a cross-sectional view of a portion of the actuator shown in FIG. 2 with the hydraulic pistons fully extended.

It is well-known that with such structures, when the operator pedal is activated, fluid pressure is generated within the master cylinder. The pressure generated within the master cylinder 26 is distributed by the passage 14 to the hydraulic actuator 12. The hydraulic actuator 12, as best seen in FIGS. 2, 3 and 4, includes a yoke or housing member 28 which has a pair of upstanding cylinder portions 30 and 32 interconnected by arms or extensions 34 and 36. The extensions 34 and 36 are formed integrally at a common end 38 which has formed therein, an opening 40 adapted to accept a threaded member, not shown. The threaded member will secure the housing 28 to the bell housing 10.

Extension 34 has a passage 42 formed therein and, as seen in FIG. 3, the passage is drilled from outer end 44 to the common end 38. It will also be noted in FIGS. 2 and 3, that passage 42 is drilled through upstanding cylinder portion 30. The extension 36 has a passage 46 drilled therein which, as seen in FIGS. 3 and 4, extends from end 48 to end 38. This passage 46 is drilled through the upstanding cylinder portion 32. End 44 of extension 34 is connected with the passage 14 while end 48 is closed by a threaded plug member 50. Thus, when the pedal mechanism 16 is actuated, both passages 42 and 46, as well as upstanding cylinders 30 and 32, will be pressurized simultaneously. Once the fluid pressure is delivered to the housing 28, there are no external passages through which the pressure must be transmitted and therefore the likelihood of leakage is considerably reduced.

Cylinder 30 has slidably disposed therein a piston 52 which has a cylindrical base portion 54 in which an annular seal 56 is secured. The base portion 54 cooperates with the upstanding cylinder portion 30 to form a chamber 58 which is sealed by seal 56 and can be pressurized simultaneously with passage 42. Thus, the pressure in upstanding cylinder 30 is available to operate on piston 52 to urge the piston 52 to move from the retracted position, shown in FIG. 2, toward the extended position shown in FIG. 4.

The piston 52 has a portion 60 extending parallel to the axis 62 of upstanding cylinder portion 30. This portion 60 is a segment of a cylinder having a segmented circular cross section 64 and a flat surface 66. The flat surface 66 extends from the cylindrical base 54 to the outer end 68. The outer end 68 has formed thereon a hook portion 70 and a flat portion 72. The flat portion 72 abuts a force transmitting member or bearing support 74 which is restrained from axial movement relative to piston 52 by the hook portion 70. The force transmitting member 74 is also connected to a piston 76 in a manner similar to that described for piston 52. The piston 76 is substantially identical to the piston 52 such that corresponding parts are given the same numerical designation with an "a" suffix and a further description is not believed necessary.

The piston 76 is selectively pressurized by chamber 58a formed through the cooperation of the piston 76 and upstanding cylinder portion 32. The chamber 58a is in fluid communication with passage 46 which, as explained above, is pressurized simultaneously with passage 42 and chamber 58. The upstanding cylinder portions 30 and 32 have pin members 78 and 80, respectively, secured therein. As seen in FIGS. 3 and 4, the pin member 78 is adjacent the flat surface 66 of piston 52 and is abutted by a flat surface 82 formed on the cylindrical base portion 54 when the piston 52 is fully extended. The pin 80 is similarly disposed relative to piston 76. The pins 78 and 80 therefore prevent rotation of pistons 52 and 76 in their respective cylinders and also limit the axial extension of the pistons 52 and 76 in their respective cylinders. Since the pistons 52 and 76 cannot rotate in their respective cylinders, the force transmitting member 74 will not become dislodged from the hook portions 70 and 70a.

The force transmitting member 74 has a central aperature 84 through which extends a sleeve portion 86 of a bearing retainer 88. The bearing retainer 88 is secured by fasteners 90 to the transmission face. The bell housing is also fastened to the transmission face, using the bearing retainer as a pilot. The bearing retainer positions and holds a bearing that supports the clutch shaft 92 which has a splined portion 94 drivingly connected to a clutch hub 96. The clutch hub 96 is connected to a conventional spring damper 98 with a clutch friction disc 100. The friction disc 100 is disposed adjacent a clutch pressure plate 102 which is drivingly connected to a clutch housing 104 adapted to be connected to an engine flywheel, not shown, in a conventional manner. Also disposed in the housing 104 is a conventional Belleville spring washer 106 which is operative to provide the engagement force on the pressure plate 102 when the friction disc 100 is to be drivingly connected to the engine. The inner edge of Belleville spring 106 operably engages a throw out bearing 108 which is slidably disposed on the outer surface of sleeve portion 86 of bushing housing 88. The Belleville spring washer 106 is operative to move the pistons 52 and 76 to the fully retracted position shown in FIG. 2, and simultaneously apply a force to pressure plate 102, thereby engaging the friction disc 100 with the engine flywheel.

When it is desirable to disengage the clutch, the operator presses on the foot pad 18 to cause the generation of pressure in the master cylinder 26 which is transmitted through the passage 14. The pressure in passage 14, as explained above, is transmitted to passages 42 and 46 and therefore chambers 58 and 58a. When the pressure in chambers 58 and 58a is sufficient to cause the pistons 52 and 76 to extend against the force in spring washer 106 to the position shown in FIG. 4, the clutch will be disengaged. The piston 52 has operatively associated therewith a coil spring 110 while the piston 76 has operatively associated therewith a similar or identical coil spring 112. The springs 110 and 112 are operative to urge the pistons 52 and 76 toward the disengaged position and therefore maintain a light load, significantly less than spring 106, on the force transmitting member 74. This small force is sufficient to maintain the throw out bearing 108 in continous abutment with the Belleville spring washer 106. As can be seen in FIG. 2, the clutch shaft 92 is rotatable about an axis 114 which is parallel with the axes 62 and 62a. As can be seen in FIG. 3, these three axes 62, and 62a and 114 are aligned in a common longitudinal plane 116 and are therefore coplanar. The force transmitted by the pistons because of the parallelism and coplanar relationship, do not have a tendency to cause canting of the force transmitting member 74. Thus, the throw out bearing and the force transmitting mechanism will not bind to prevent clutch operation.

The bell housing 10 is a conventional bell housing which can be utilized with a conventional mechanical clutch linkage. However, due to the increased packaging problems which occur with smaller vehicles, it is becoming more difficult to find space sufficient for the mechanical linkages. The hydraulic actuator disclosed herein permits the connection between the operator member and the clutch actuator to be routed through the space available since the fluid pressure generation is substantially unaffected by this routing. It should also be appreciated that through judicious selection of the master cylinder and the diameter of the pistons 52 and 76 that the force available to disengage the clutch can be readily tailored for various size transmissions.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A hydraulic actuator mechanism for a friction clutch having an output shaft and a clutch spring disposed coaxial with the output shaft for engaging the clutch, said clutch being manually released, said mechanism comprising; a housing having a pair of cylinders each having an axis parallel with and radially spaced from the output shaft and a pair of intersecting internal fluid passages spaced from the output shaft and interconnecting said cylinders; a pair of pistons slidably disposed in respective ones of said cylinders; force transmitting means operatively connected to said pistons; a bearing member abutting said force transmitting means and being operatively connected with the clutch engaging spring; and pedal operated operator means in fluid communication with said internal passages for selectively supplying fluid pressure through said internal passages to said cylinders so that said pistons will be extended to operate the clutch spring through said bearing and force transmitting means to disengage said clutch, said clutch spring being operable to cause retraction of said pistons in said cylinders when the fluid pressure is released to engage said clutch.

2. A hydraulic actuator mechanism for a friction clutch having an output shaft and a clutch spring disposed coaxial with the output shaft for engaging the clutch, said clutch being manually released, said mechanism comprising; a housing having a pair of cylinders each having an axis parallel with and radially spaced from the output shaft and a pair of intersecting internal fluid passages spaced from the output shaft and interconnecting said cylinders; a pair of pistons slidably disposed in respective ones of said cylinders, each piston having a cylindrical base and a segmented portion; pin means secured in each cylinder cooperating with said segmented portion to prevent rotation of each piston in its respective cylinder; force transmitting means operatively connected to said pistons; a bearing member abutting said force transmitting means and being operatively connected with the clutch engaging spring; and pedal operated operator means in fluid communication with said internal passages for selectively supplying fluid pressure through said internal passages to said cylinders so that said pistons will be extended to operate the clutch spring through said bearing and force transmitting means to disengage said clutch, said clutch spring being operable to cause retraction of said pistons in said cylinders when the fluid pressure is released to engage said clutch.

3. A hydraulic actuator mechanism for a friction clutch having an output shaft and a clutch spring disposed coaxial with the output shaft for engaging the clutch, said clutch being manually released, mechanism comprising; a housing having a pair of cylinders each having an axis parallel with, radially spaced from, and coplanar with the longitudinal axis of the output shaft, and a pair of intersecting internal fluid passages interconnecting said cylinders and being spaced from and oblique to the output longitudinal axis of the output shaft; a pair of pistons slidably disposed in respective ones of said cylinders; pin means secured in each said cylinder for cooperating with said pistons to prevent rotation of said piston and to limit the linear movement of the piston in the disengaging direction; force transmitting means operatively connected to said pistons; a bearing member abutting said force transmitting means and being operatively connected with the clutch engaging spring; and pedal operated operator means in fluid communication with said internal passages for selectively supplying fluid pressure through said internal passages to said cylinders so that said pistons will be extended to operate the clutch spring through said bearing and force transmitting means to disengage said clutch, said clutch spring being operable to cause retraction of said pistons in said cylinders when the fluid pressure is released to engage said clutch.

* * * * *

UNITED STATES PATENT AND TRADEMARK OFFICE
CERTIFICATE OF CORRECTION

PATENT NO. : 4,328,883
DATED : May 11, 1982
INVENTOR(S) : Ronald L. Shellhause

It is certified that error appears in the above—identified patent and that said Letters Patent is hereby corrected as shown below:

Column 4, line 55 (Claim 3), after "released," insert -- said --.

Signed and Sealed this

Fifth Day of October 1982

[SEAL]

Attest:

*Attesting Officer*

GERALD J. MOSSINGHOFF
*Commissioner of Patents and Trademarks*